United States Patent [19]

Baer

[11] Patent Number: 5,660,587
[45] Date of Patent: Aug. 26, 1997

[54] PASSIVE VENTILATION SYSTEM AND METHOD

[75] Inventor: Stephen C. Baer, Albuquerque, N. Mex.

[73] Assignee: Zomeworks Corporation, Albuquerque, N. Mex.

[21] Appl. No.: 498,712

[22] Filed: Jul. 3, 1995

Related U.S. Application Data

[63] Continuation-in-part of Ser. No. 275,061, Jul. 13, 1994, abandoned.

[51] Int. Cl.⁶ ........................................... F24F 7/00
[52] U.S. Cl. ........................................ 454/237; 429/71
[58] Field of Search .................. 126/85.8; 429/71, 429/82, 83; 454/8, 48, 57, 184, 23, 250

[56] References Cited

U.S. PATENT DOCUMENTS

| | | | |
|---|---|---|---|
| 627,010 | 6/1899 | Perdue | 454/48 X |
| 960,921 | 6/1910 | Hill | 454/237 |
| 1,112,861 | 10/1914 | Snyder | 429/71 |
| 1,236,673 | 8/1917 | Chamberlain | 429/71 |
| 1,313,512 | 8/1919 | Bedell et al. | 429/71 X |
| 2,364,144 | 12/1944 | Hunsaker | 454/237 X |
| 3,271,710 | 9/1966 | Leonard | 454/237 X |
| 4,111,004 | 9/1978 | Blomberg | 126/85 B X |

FOREIGN PATENT DOCUMENTS

| | | | |
|---|---|---|---|
| 800329 | 8/1958 | United Kingdom | 429/71 |

*Primary Examiner*—Harold Joyce
*Attorney, Agent, or Firm*—Townsend and Townsend and Crew LLP

[57] ABSTRACT

A passive ventilation system and method for venting hydrogen from a chamber housing a battery. The system comprises a battery chamber with an exhaust opening and an inlet opening near the upper end of the chamber. A heat conductive, gas impervious conduit extends through the chamber from the inlet opening to a position near the lower end of the chamber. The conduit includes a horizontal portion that allows heat transfer between the interior and exterior of the conduit to equalize the temperature of the gas in the conduit and the gas inside the chamber. In this manner, the incoming fresh air will reach the same temperature as the inside gas before it descends to the lower end of the chamber thereby minimizing convective flow in the absence of hydrogen build-up in the chamber.

19 Claims, 3 Drawing Sheets

PASSIVE VENTILATION SYSTEM AND METHOD

This application is a continuation-in-part of application Ser. No. 08/275,061, filed Jul. 13, 1994, abandoned.

FIELD OF THE INVENTION

This invention relates to passive ventilation systems generally, and more specifically to a passive ventilation system and method for venting hydrogen from a battery enclosure.

BACKGROUND OF THE INVENTION

Battery charging commonly occurs in millions of remote cabinets, office buildings and electric vehicles. Unfortunately, battery charging has resulted in numerous explosions that destroy the battery and its container and possibly injure or kill people. These explosions are often caused by igniting hydrogen in insufficiently ventilated battery chambers.

When batteries are overcharged, the current in the cell produces hydrogen. Hydrogen becomes an explosion hazard when its concentration rises to about 4% volume in air, generally referred to as the lower explosive limit (LEL). To avoid this hazard, battery chambers are typically vented to release the hydrogen to the environment. Ventilation can be generated by active venting systems such as small fans located within the battery chamber or large passive vents that allow flow by convection and diffusion between the inside gas and the outside air.

Passive ventilation systems generally work by taking advantage of the fact that ambient air is denser than hydrogen. T9 hus, hydrogen released into a battery chamber by overcharging batteries lessens the density of the gas causing it to rise within the chamber. Typically, the chamber will have one lower and one upper vent so that the rising gas within the chamber flows out through the upper vent. Fresh outside air will then flow through the lower vent to replace the lost gas in the chamber.

One problem with existing passive ventilation systems is that they are typically sensitive to temperature differences between the air inside the battery chamber and the outside environment. Warmer air tends to rise in the same manner as lower density air. If the inside temperature is cooler, for example, the cooler air will be urged downward thereby counteracting the convective flow caused by the lower density hydrogen in the chamber. In fact, if the inside temperature is substantially cooler (on the order of 2%), convective flow completely stops and the hydrogen concentration will slowly build-up in the chamber. If the inside temperature is warmer, the inside gas will rise causing unwanted ventilation when there is no hydrogen present in the chamber.

Another problem with existing passive ventilation systems is that they are typically sensitive to pressure differences between the incoming and outgoing air. For example, wind pressure against the upper and lower vent openings may create a pressure gradient across these two openings. Similar to the temperature differential, this pressure difference may offset the convective flow caused by hydrogen concentration or may cause unwanted convective flow in the absence of any hydrogen.

SUMMARY OF THE INVENTION

The present invention is directed to a passive ventilation system and method that solves these problems of temperature differences between the inside of the chamber and the outside environment and pressure gradients across the inlet and outlet of the chamber. The invention provides a reliable device that effectively eliminates the effect of temperatures and pressures on ventilation so that ventilation will only occur when there is an increase of hydrogen concentration in the battery chamber.

In one aspect of the invention, the passive ventilation system comprises a battery chamber with an exhaust opening and an inlet opening proximate the upper end of the chamber. A heat conductive, gas impervious conduit extends through the chamber from the inlet opening to a position proximate the lower end of the chamber. The conduit includes a first generally horizontal portion proximate the top of the chamber and a second generally vertical portion extending from the first portion to the position at the bottom of the chamber.

An important advantage of the system is that the first horizontal portion of the conduit allows heat transfer between the interior and exterior of the conduit to equalize the temperature of the gas in the conduit and the gas inside the chamber. Therefore, the incoming fresh air will reach the same temperature as the inside gas before it descends through the second vertical portion. In this manner, temperature differences between the inside and outer gases will not generate convective flow. Thus, flow through the conduit will generally not occur unless a low density gas, such as hydrogen, is present inside the chamber.

In a preferred embodiment, the first horizontal portion of the conduit will be at least as long as the second vertical portion. This ensures that the first horizontal portion will have a sufficient heat transfer area to equalize the temperatures of the gas within the conduit and the gas inside the chamber. According to one embodiment of the invention, the horizontal portion of the conduit splits into two paths to increase the heat transfer area. In another embodiment, the horizontal portion zig-zags throughout the top portion of the chamber to maximize its length within the chamber thereby increasing the duration of the heat transfer area in the horizontal portion of the conduit.

To minimize pressure effects, the inlet and exhaust openings may be positioned side by side in a vertical side wall of the chamber to substantially equalize the wind pressure against these openings. In addition, a wind baffle may be placed over the inlet and exhaust openings. The wind baffle preferably has a front wall opposite the inlet and exhaust openings and four side walls connecting the front wall to the side wall of the chamber. The wind baffle further includes two duct openings to allow fresh air and hydrogen to flow in and out. The wind baffle creates a stagnant volume of air proximate the inlet and exhaust openings to minimize pressure differences caused by the wind.

The above is a brief description of some deficiencies in the prior art and advantages of the present invention. Other features, advantages and embodiments of the invention will be apparent to those skilled in the art from the following description, accompanying drawings and appended claims.

DESCRIPTION OF THE PREFERRED EMBODIMENT

Figure 1:
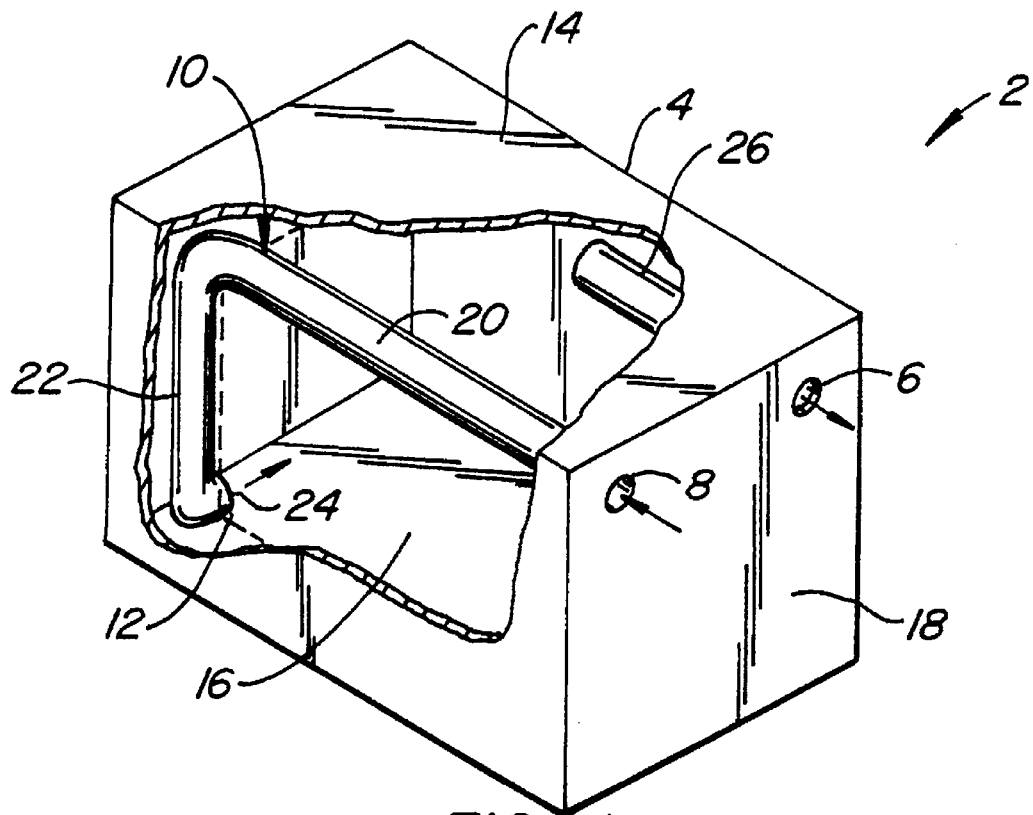
FIG. 1 is a perspective view of a passive ventilation system having a chamber with inlet and exhaust opening in accordance with the present invention.

Referring to the drawings in detail, wherein like numerals indicate like elements, a passive ventilation system 2 is illustrated according to the principles of the present invention. Referring to FIG. 1, passive ventilation system 2 generally includes a chamber 4 having an exhaust opening 6, an inlet opening 8 and a conduit 10 extending from inlet opening 8 to a position 12 near the bottom of chamber 4.

Chamber 4 has a top wall 14, a bottom wall 16 and four substantially vertical sidewalls 18. The walls of chamber 4 are impervious to gases so that chamber 4 can be utilized to protect the contents from the elements, including extreme heat and cold. In a preferred embodiment, chamber 4 is configured to house batteries that emit hydrogen when overcharged, such as lead acid batteries. Although chamber 4 is shown as having a rectangular shape, chamber 4 can have a variety of sizes and shapes depending on the particular batteries housed therein.

Conduit 10 is a heat conductive, gas impervious, hollow tube constructed from any suitable material such as copper. Conduit 10 includes a first generally horizontal portion 20 and a second generally vertical portion 22. First portion 20 extends from inlet opening 8 to a point proximate a sidewall 18 opposite inlet opening 8 to provide a large heat transfer area (discussed in further detail below). Conduit 10 then bends downwards into second portion 22 and extends to position 12 near bottom wall 16 of chamber 3. Second portion 22 has an opening 24 at position 12 so that fresh air inside conduit 10 may flow into chamber 4. It should be noted that conduit 10 is not limited to the circular cross-sectional shape shown in FIG. 1 and conduit 10 can have a variety of configurations such as rectangular, triangular or channel cross-sectional shapes.

As shown in FIG. 1, inlet opening 8 and exhaust opening 6 are both positioned proximate top wall 14 of chamber 4. This configuration ensures that gas exiting exhaust opening 6 will be at approximately the same height relative to chamber 4 as fresh air entering inlet opening 8 and conduit 10 to minimize temperature effects on convective flow. In addition, inlet and exhaust openings 6, 8 are positioned side by side in the same side wall 18 so that the wind pressure will be approximately equal at each of these openings. This minimizes pressure gradients across inlet and exhaust openings 6, 8 that could hinder convective flow (further details of temperature and pressure differentials will be discussed below).

It should be noted that the invention is not limited to the exact configuration shown in the drawings. For example, inlet opening 8 and exhaust opening 6 can be disposed closer together or farther apart. In addition, these openings could be formed in different sidewalls 18 so long as wind pressure around chamber 4 is not a large factor (i.e. within an automobile or office building). Alternatively, inlet and exhaust openings 6, 8 could be formed in top wall 14. In this configuration, conduit 10 would extend downward from inlet 8 and immediately bend into a horizontal orientation to allow for heat transfer with the inside of chamber 4.

As the outside air passes through conduit 10, it will be slowed by friction with the inner wall of conduit 10. Therefore, inlet opening 8 should be larger than exhaust opening 6 and preferably has an area approximately twice as large as the area of exhaust opening 6. The larger inlet opening 8 will offset the slower flow rate through conduit 10 by providing a larger area for the air to pass through inlet opening 8 than exhaust opening 6.

In operation, chamber 4 is adapted to house a device that may emit a low density, hazardous gas such as a battery that emits hydrogen when it is overcharged. When hydrogen is produced within chamber 4, it diffuses throughout chamber 4 before entering opening 24 of conduit 10 because opening 24 is positioned near bottom wall 16 of chamber 4 (the lower density hydrogen will rise within the chamber). The hydrogen lowers the density of the air within chamber 4 causing it to flow out through exhaust opening 6 while higher density, fresh air enters inlet opening 8. As the fresh air passes through first portion 20 of conduit 10, heat transfer will occur through the thin walls of first portion 20 to equalize the temperature of the fresh air and the gas within chamber 4. Thus, by the time the fresh air begins to descend through second portion 22, the temperatures of the fresh air within conduit 10 and the gas within chamber 4 will be approximately equal thereby minimizing thermal convection.

In this manner, the outside temperature will have very little effect on the ventilation of chamber 4. As the concentration of hydrogen increases in chamber 4, the inside gas will rise and flow out through exhaust opening 6 as fresh air replaces it through inlet opening 8 and conduit 10. This innate convective flow will occur regardless of whether the outside environment is colder or hotter than the inside of chamber 4 because thermal convection has been minimized. In addition, convective flow will generally not occur in the absence of hydrogen build-up in chamber 4.

Figure 2:
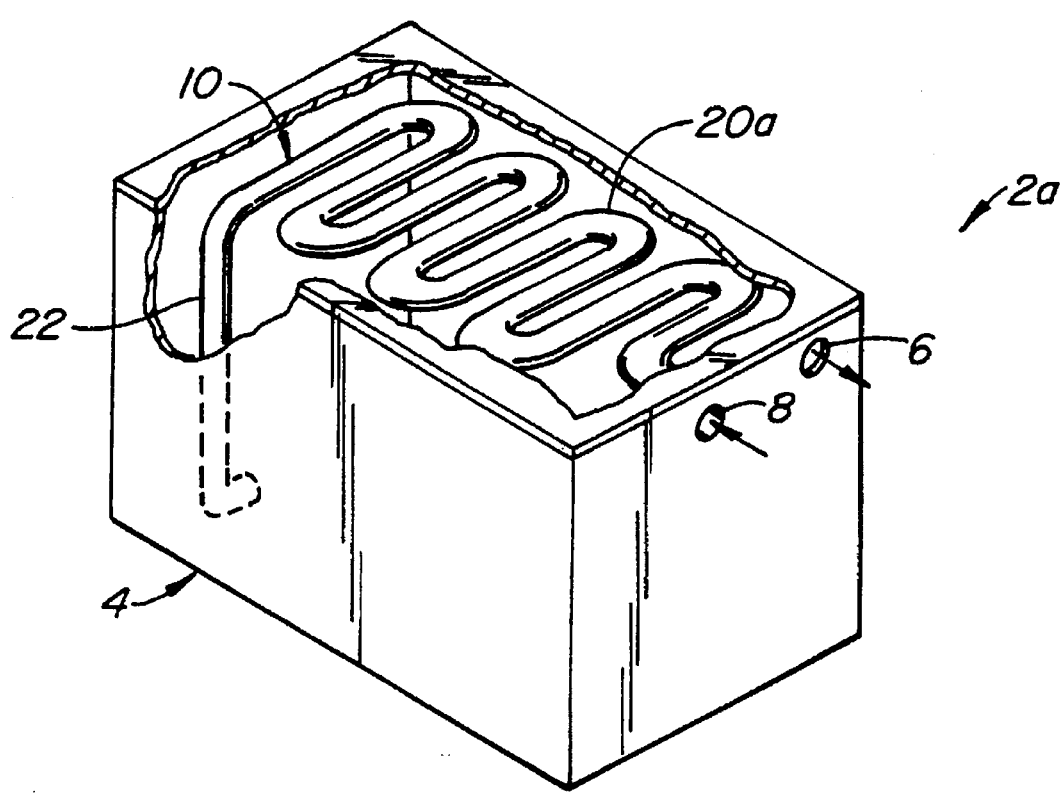
FIG. 2 is a perspective view of another embodiment of a passive ventilation system.

FIG. 2 illustrates another embodiment of a passive ventilation system 2a in accordance with the invention. In this embodiment, a first horizontal portion 20a extends from inlet opening 8 to second vertical portion 22 in the manner described above. However, first portion 20a zig-zags throughout the top portion of chamber 4 to increase the flow path between inlet opening 8 and vertical portion 22. This increases the overall area of first portion 20a to facilitate heat transfer between the fresh air within conduit 10 and the gas within chamber 4. Thus, the gas temperatures can be substantially equalized in climates where the outside air is much hotter or colder than the inside of chamber 4. For example, remote cabinets in colder climates often have thick insulated walls to maintain a suitable temperature for the charging batteries inside. Under these conditions, the cold outside air must undergo a substantial heat transfer to equalize its temperature with the inside gas.

Figure 3:
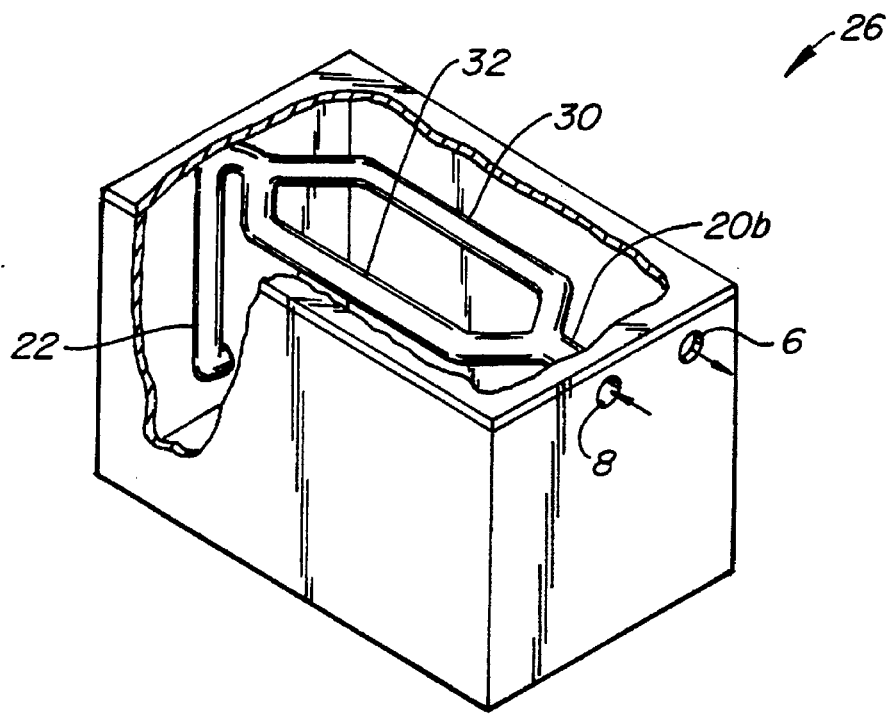
FIG. 3 is a perspective view of a further embodiment of a passive ventilation system.

FIG. 3 illustrates a further embodiment of a passive ventilation system 2b according to the principles of the invention. In this embodiment, first portion 20b splits into two parallel sections 30, 32 which extend along the top portion of chamber 4. Sections 30, 32 recombine before first portion 20b descends into second portion 22 so that all of the fresh air entering inlet opening 6 will pass through second portion 22 and into chamber 4. Similar to the embodiment shown in FIG. 2, this configuration increases the overall area of first portion 20b to facilitate heat transfer between the outside air and the gas within chamber 4.

Adverse weather conditions, such as severe winds, can generate pressure gradients around chamber 4. These pressure gradients may hinder the innate convective flow from hydrogen build-up or may generate convective flow in the absence of hydrogen. Therefore, inlet and exhaust openings 6, 8 are preferably positioned adjacent each other in the same sidewall 18 of chamber 4. In addition, a second conduit 26 may be added to connect exhaust opening 6 to the inside of chamber 4, as shown in FIG. 1. Second conduit 26 serves to minimize pressure effects on convective flow because small, but frequent pressures changes around chamber 4 cause back and forth tidal flow within conduit 26 rather than an exchange with the outside air.

Figure 4:
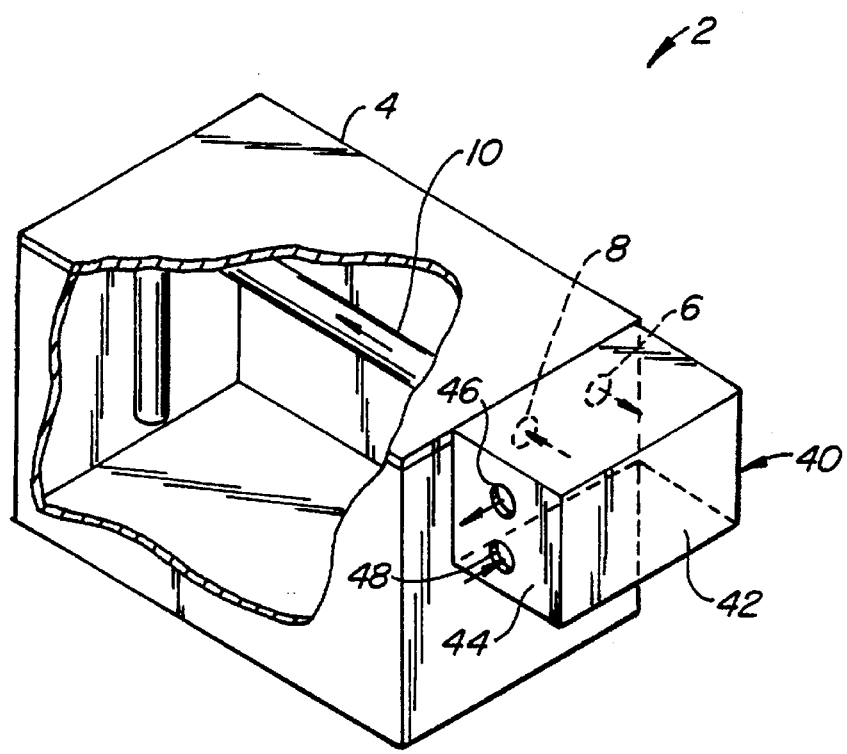
FIG. 4 is a perspective view of the passive ventilation system of FIG. 1 with a wind baffle shielding the inlet and exhaust openings.

To further minimize the pressure gradient across inlet and exhaust openings 6, 8, passive venting system 2 may include a wind baffle 40 mounted to a sidewall 18 of chamber 4, as shown in FIG. 4. Wind baffle 40 comprises an outer wall 42 opposite the inlet and outlet exhausts 6, 8 and four connecting walls 44 that attach outer wall 42 to sidewall 18 of chamber 4. Wind baffle 40 further includes two duct openings 46, 48 in one of the connecting walls 44. Duct openings 46, 48 allow fresh air to enter wind baffle 40 and chamber 4 through inlet 8 and hydrogen to exit chamber 4 and wind baffle 40. It will be noted that duct openings 46, 48 could also be formed in either outer wall 42 or any one of the other connecting walls 44.

Wind baffle 40 completely encloses inlet and exhaust openings 6, 8 to prevent wind pressure from creating unequal pressures at each of these openings. Wind baffle 40 creates an almost stagnant volume of air at the inlet and exhaust openings 6, 8 so that these openings have a substantially equal fluid pressure. This effectively eliminates pressure differences that could offset convective flow due to the presence of hydrogen or initiate convective flow in the absence of hydrogen (similar to the temperature differentials described above).

Figure 5:
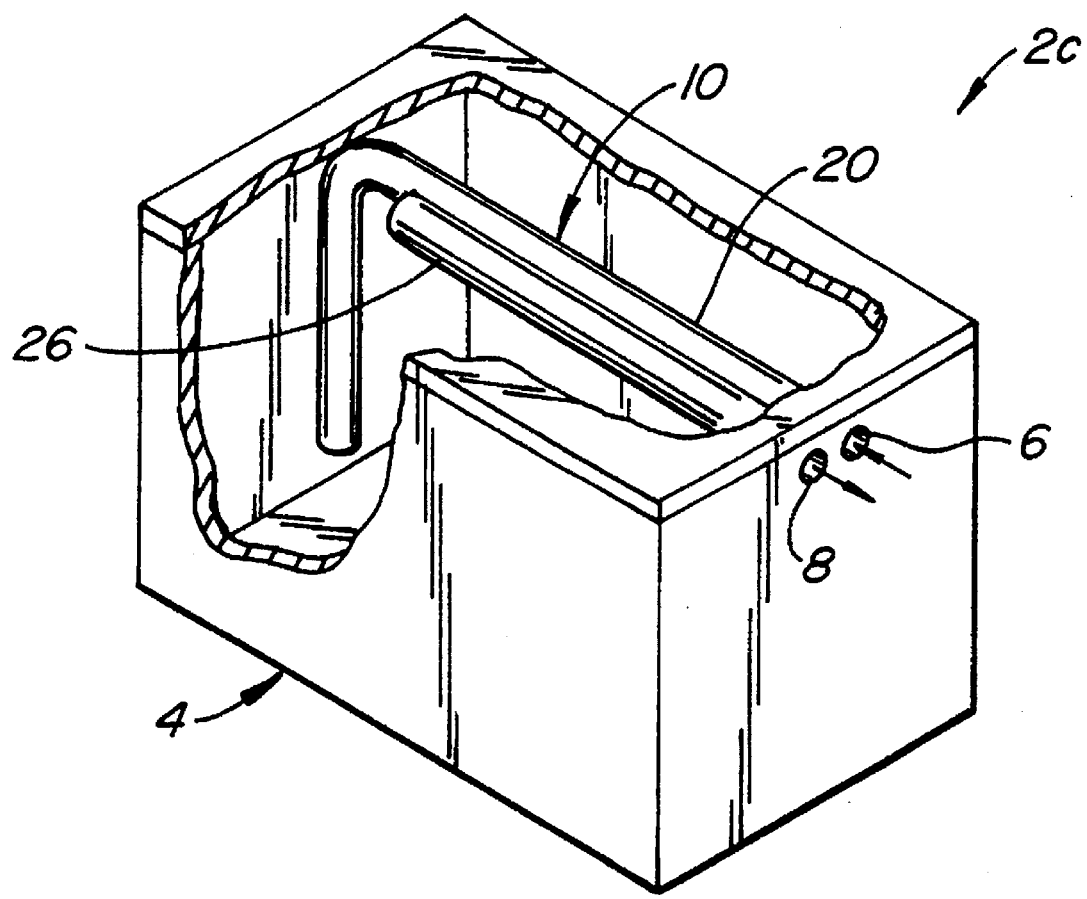
FIG. 5 is a perspective view of another passive ventilation system having inlet and outlet conduits in a heat exchange relationship with each other.

FIG. 5 illustrates another embodiment in which first and second conduits 10, 26 contact each other along a substantial portion of the length of second conduit 26. Preferably, first, horizontal portion 20 of conduit 10 is pressed or soldered to second conduit 26 to form a heat exchange relationship therebetween. As the fresh air passes through first portion 20 of conduit 10, heat transfer will occur through the walls of conduits 10, 26. In this manner, the incoming fresh air will exchange heat with the outgoing hydrogen enriched air, rather than the air within chamber 4. Thus, for example, if the exterior air temperature is warmer, the heat carried in by the incoming fresh air will be exchanged with the outgoing air and discharged through conduit 26 (rather than increasing the temperature of the air within chamber 4).

Other modifications and variations can be made to disclose embodiments without departing from the subject invention as defined in the following claims. For example, conduits 10, 26 may be constructed so that their ends are belled outward. This construction would facilitate the flow of air into and out of conduits 10, 26, thereby decreasing the energy loss of the air passing through the conduits.

What is claimed is:

1. Apparatus for venting a low density gas from a chamber having a vertical extent, comprising:
   an exhaust opening proximate the upper end of the chamber providing gaseous communication between the interior and the exterior of the chamber;
   an inlet opening proximate the upper end of the chamber; and
   a heat conductive, open ended, gas impervious conduit within the chamber and extending from the inlet opening to a position proximate the lower end of the chamber to provide gaseous communication between the exterior and the interior of the chamber through said inlet opening to said position, said conduit including a first portion proximate the top of the chamber to allow heat transfer between the interior and the exterior of the conduit through the walls of the conduit to equalize the temperature of the gas in the conduit and the temperature of the gas inside the chamber to minimize flow through the conduit in the absence of a low density gas inside the chamber, and a second portion extending from the first portion to said position proximate the lower end of the chamber, wherein the first portion of the conduit is substantially horizontal, and the second portion of the conduit is substantially vertical.

2. The apparatus of claim 1 wherein the conduit is a copper tube.

3. The apparatus of claim 1 wherein the conduit additionally includes a third, substantially horizontal portion in communication with the second portion and the inlet opening.

4. The apparatus of claim 1 wherein the first portion has a length measured from the inlet opening to the second portion, the first portion being configured within the chamber to maximize said length so that the temperature of the gas in the conduit and the temperature of the gas inside the chamber are substantially equalized before the gas in the conduit enters the second portion.

5. The apparatus of claim 4 wherein the first portion generally zig-zags throughout the upper end of the chamber.

6. The apparatus of claim 1 wherein the inlet opening is larger than the exhaust opening to account for friction in the conduit.

7. The apparatus of claim 1 wherein the inlet opening is approximately twice the area of the exhaust opening.

8. The apparatus of claim 1 further including a second generally horizontal conduit extending from the exhaust opening to a position within the chamber.

9. The apparatus of claim 8 wherein a substantial portion of the second conduit contacts the first portion of the first conduit so that the first and second conduits are in heat exchange relationship with each other.

10. A method for passively venting a low density gas from a chamber having a vertical extent, comprising the steps of:
    providing an exhaust opening proximate the upper end of the chamber to allow gaseous venting from the chamber;
    providing an inlet opening proximate the upper end of the chamber and a gas impervious, heat conductive, open ended conduit from the inlet opening to a position proximate the lower end of the chamber, the conduit including a first generally horizontal portion and a second generally vertical portion;
    allowing air to enter the inlet opening;
    transferring heat through the walls of the horizontal portion of the conduit to equalize the temperatures of the interior and exteriors of the chamber to minimize the flow of air through the conduit in the absence of a low density gas inside the chamber; and
    allowing the air within the conduit to flow through the vertical portion of the conduit and enter the interior of the chamber at said position proximate the lower end of the chamber and the low density gas inside the chamber to exit through the exhaust opening.

11. A container for the storage of devices which produce a low density, hazardous gas comprising:
    a chamber having sidewalls, a bottom and a top:
    an exhaust opening proximate the top of the chamber to allow a low density gas to escape the chamber;

an inlet opening proximate the top of the chamber to allow gas at ambient density to enter the chamber;

a first, conduit within the chamber and extending from the inlet opening to a position proximate the bottom of the chamber so that gas at ambient density can flow into the interior of the chamber through said inlet opening to said position;

a second generally horizontal conduit extending from the exhaust opening to a position within the chamber, a substantial portion of the second conduit contacting the first portion of the first conduit so that the first and second conduits are in heat exchange relationship with each other; and wherein said first conduit comprises a first portion proximate the top of the chamber to allow heat transfer between the interiors of the first and second conduits through the walls of the conduits to equalize the temperature of the gas in the first conduit and the temperature of the gas inside the second conduit to minimize flow through the first conduit in the absence of a low density gas inside the chamber, and a second portion extending from the first portion to said position proximate the bottom of the chamber.

12. The apparatus of claim 11 wherein the inlet opening and the exhaust opening are adjacent to each other in one of the sidewalls of the chamber.

13. The apparatus of claim 11 wherein the inlet opening and the exhaust opening are adjacent to each other in the top of the chamber.

14. The apparatus of claim 11 further including a wind baffle mounted outside of the chamber, the wind baffle enclosing the inlet opening and the exhaust opening to equalize the pressure at the inlet opening with the pressure at the exhaust opening to minimize flow through the chamber in the absence of a low density gas.

15. The apparatus of claim 14 wherein the wind baffle includes an inlet to allow gas at ambient density to enter the wind baffle and the chamber and an outlet to allow a low density gas to exit the chamber and the wind baffle.

16. The apparatus of claim 15 wherein the wind baffle comprises an outer wall opposite the inlet and exhaust openings and four side walls coupling the outer wall to the chamber so to enclose the inlet and exhaust openings within the wind baffle.

17. The apparatus of claim 16 wherein the side walls of the wind baffle have a length extending from the outer wall to the chamber, the length being approximately four times the diameter of the inlet opening.

18. The apparatus of claim 15 wherein the wind baffle inlet and outlet are larger than the inlet opening.

19. A container for the storage of batteries, comprising:

a chamber having sidewalls, a bottom and a top;

an exhaust opening in one of said sidewalls proximate the top of the chamber to allow the low density gas to escape the chamber;

an inlet opening having an area larger than the area of the exhaust opening in one of said sidewalls proximate the top of the chamber to allow air at ambient density to enter the chamber; and a heat conductive, open ended, gas impervious tube within the chamber and extending from the inlet opening to a position proximate the bottom of the chamber so that gas at ambient density can flow into the interior of the chamber through said inlet opening to said position, said tube including a first substantially horizontal portion proximate the top of the chamber to allow heat transfer between the interior and the exterior of the tube through the walls of the conduit to equalize the temperature of the gas in the tube and the temperature of the gas inside the chamber to minimize flow through the tube in the absence of a low density gas inside the chamber, and a second substantially vertical portion extending from the first portion to said position proximate the bottom of the chamber.

* * * * *